United States Patent [19]
Tracy

[11] Patent Number: 5,337,714
[45] Date of Patent: Aug. 16, 1994

[54] ENGINE PISTON WITH A DUAL COMBUSTION BOWL LIP RADIUS

[75] Inventor: Lawrence P. Tracy, Hudson, Iowa
[73] Assignee: Deere & Company, Moline, Ill.
[21] Appl. No.: 116,189
[22] Filed: Sep. 3, 1993
[51] Int. Cl.⁵ .............................. F02F 3/26
[52] U.S. Cl. .............................. 123/279
[58] Field of Search .................. 123/263, 276, 279

[56] References Cited

U.S. PATENT DOCUMENTS

| | | | |
|---|---|---|---|
| 2,505,999 | 5/1950 | Smith | 123/279 |
| 3,954,089 | 5/1976 | Hardesty et al. | 123/263 |
| 4,501,239 | 2/1985 | Bauer | 123/279 |
| 4,693,219 | 9/1987 | Burgio | 123/279 |
| 4,838,222 | 6/1989 | Yanagisawa et al. | 123/263 |
| 5,099,809 | 3/1992 | Kawatani et al. | 123/279 |

FOREIGN PATENT DOCUMENTS

| | | | |
|---|---|---|---|
| 3720865 | 1/1989 | Fed. Rep. of Germany | 123/279 |
| 0105227 | 5/1988 | Japan | 123/279 |
| 1502862 | 8/1989 | U.S.S.R. | 123/279 |

*Primary Examiner*—David A. Okonsky

[57] ABSTRACT

The lip of the combustion bowl of a piston for an internal combustion engine has different radii in different sections of the bowl. Most of the lip is sharp to reduce emissions. The part of the lip above the piston pin bore is less sharp to reduce the mechanical stresses that otherwise would accumulate there in a sharp lip, cracking the piston. The lip has a smooth transition between the two radii to avoid creating additional stress.

6 Claims, 1 Drawing Sheet

ENGINE PISTON WITH A DUAL COMBUSTION BOWL LIP RADIUS

BACKGROUND OF THE INVENTION

1. Field of the Invention

The present invention relates to pistons for internal combustion engines, and in particular to the shape of the lip of the combustion bowl of such pistons.

2. Description of the Related Art

Future emissions regulations require significant reductions in internal combustion engine emission of particulates, visible smoke, hydrocarbons and $NO_x$. It has long been known in the industry that making the combustion bowl lip sharp or as nearly sharp as possible helps reduce such emissions. Unfortunately, the sharper the lip, the higher the mechanical stress in the lip, so this has not been a satisfactory emissions control technique in the real world.

Such stress is particularly a problem in the portion of the combustion bowl lip directly above the pin bore of the piston. The piston is thinnest there, and the stress caused by a small, e.g., less than about 1 mm nominal radius, lip is more than the piston can withstand. It typically cracks after a moderate amount of use, leading to catastrophic failure.

One possible solution would be to make the piston out of materials which can withstand a higher degree of stress than the materials conventionally used. In large engines, the pistons normally are made of cast aluminum for reduced mass. Fiber reinforced squeeze castings and ferrous one-piece or articulated pistons would be significantly stronger. Unfortunately, they also are significantly more expensive and heavier.

SUMMARY OF THE INVENTION

The object of the present invention is to provide a piston having a sharp-edged combustion bowl which will not crack due to normal stresses above the pin bores.

This object is achieved according to the present invention by providing different parts of the bowl lip with different radii. Most of the lip is a sharp or nearly sharp lip, e.g., one with a 0.75 mm nominal radius. However, the sections of the lip directly above the pin bores are provided with a slightly less sharp lip, e.g., one with a 1.5 mm nominal radius. The lip then makes a smooth transition between the two radii. An abrupt transition should be avoided, since this would only create lip sections with even higher stresses than the original sharp lip.

The sharp or nearly sharp radius around most of the bowl lip can be optimized to provide optimum emission reduction and thermal crack resistance. The less sharp sections of the lip should be kept to as small a radius and as short an arc length as possible to minimize their effects on emissions performance. In addition, on a two-valve per cylinder engine, the less sharp sections of the lip normally would be positioned under the valves in the cylinder head. The valves normally are recessed from the bottom surface of the cylinder head, so that a gap exists between the piston crown and the valve regardless of the sharpness of the lip. As a result, the effect on emissions will be least because the sections of the lip with the decreased sharpness are below the valves.

The piston can be formed in any manner. However, a preferred manner is to first cast and machine the piston to have a bowl which has a sharp or nearly sharp lip around its entire circumference. The lip then can be brushed in the sections above the piston bore to dull the lip, and to provide a smooth transition between the sharp sections of the lip and the dull, or less sharp, sections of the lip.

BRIEF DESCRIPTION OF THE DRAWINGS

The invention will be described in greater detail with reference to the drawings, in which.

DETAILED DESCRIPTION OF THE PREFERRED EMBODIMENT

Figure 1:
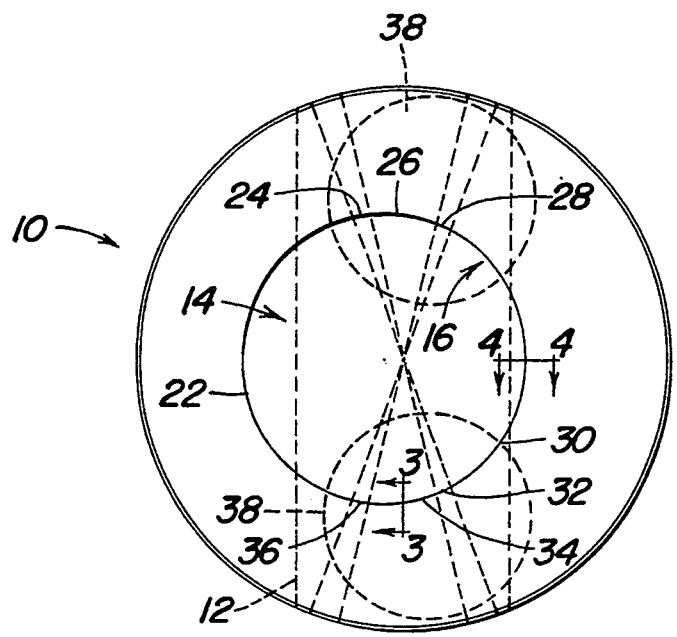
FIG. 1 is a plan view of a piston according to the present invention.
Figure 2:
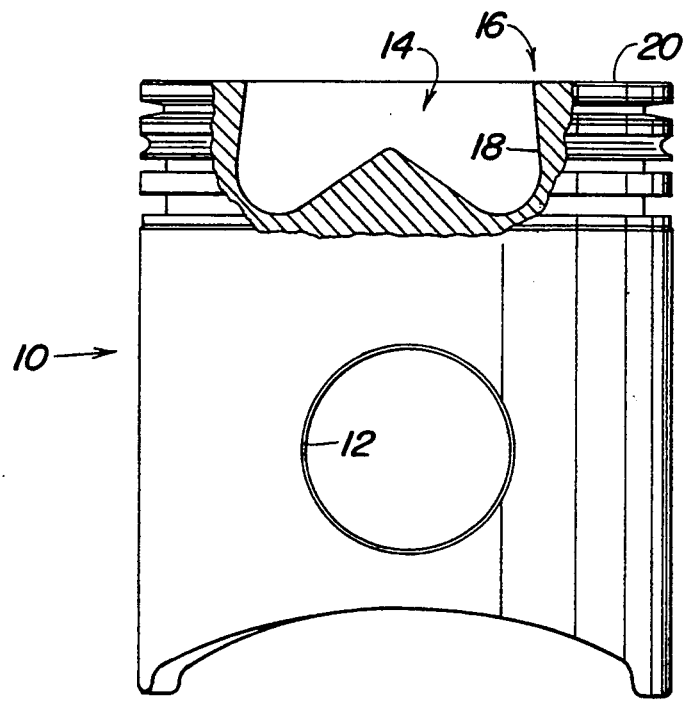
FIG. 2 is a cross-sectional view of the piston of FIG. 1.

FIGS. 1 and 2 illustrate a piston 10 according to the present invention. The piston has a pin bore 12 formed therein through which a pin (not shown) can be positioned to mount the piston 10 to a piston rod (not shown) in the usual manner. The piston 10 also has a combustion bowl 14 formed in its top surface. (Top, bottom, and the like as used herein refer only to relative positions in the drawings.) A lip 16 is formed at the transition between the side walls 18 of the combustion bowl 14 and the crown 20 of the piston 10.

Figure 3:
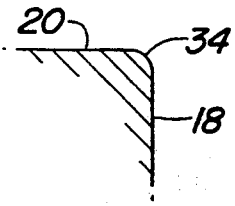
FIGS. 3 and 4 are expanded cross-sectional views of details of the lip of the combustion bowl of the piston of FIG. 1.
Figure 4:
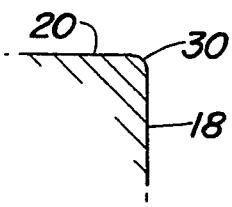

The lip 16 has eight different sections 22, 24, 26, 28, 30, 32, 34, 36. Most of the lip 16 is in sections 22, 30, which are sharp or nearly sharp, e.g., they may have a 0.75 mm nominal radius, as shown in exaggerated size in FIG. 4. The two sections 26, 34 of the lip 16 are directly above the top of the piston bore 12, and are less sharp than sections 22, 30, e.g., they may have a 1.5 mm nominal radius, as shown in exaggerated size in FIG. 3. The remaining four sections 24, 28, 32, 36 of the lip 16 are transition sections positioned between the sections 22, 26, 30, 34, respectively. The radius of the transition sections changes smoothly from the radius of the sharp or nearly sharp sections 22, 30 to that of the less sharp sections 26, 34. Preferably, the piston 10 is positioned in an engine cylinder such that the less sharp sections 26, 34 are positioned beneath valves 38.

In most circumstances, the less sharp sections 22, 30 and the transition sections 24, 28, 32, 36 need not extend laterally out as far as the pin bore 12 does. This is because the piston is thicker above the laterally outer portions of the pin bore, and therefore can better withstand the sharper radius used in sections 22, 30.

Preferably the piston is made of conventional materials, e.g., aluminum, by first casting and then machining the piston in the conventional manner to produce a piston having a combustion bowl with a sharp or nearly sharp lip around its entire circumference. The lip then is brushed above the pin bore 12 to produce the less sharp sections 26, 34 and the transition sections 24, 28, 32, 36. Alternatively, the lip could be produced by milling, routing, casting or otherwise.

While the invention has been described in conjunction with a specific embodiment, it is to be understood that many alternatives, modifications and variations will be apparent to those skilled in the art in light of the foregoing description. For instance, the specific dimensions given are simply examples. It will be readily understood that different dimensions might be used with different pistons or bowl geometries. Accordingly, this invention is intended to embrace all such alternatives, modifications and variations which fall within the spirit and scope of the appended claims.

I claim:

1. A piston having a piston body having a crown, a combustion bowl formed therein, a lip which serves as the transition between the combustion bowl and the crown, and a pin bore formed therein beneath the combustion bowl, characterized in that the lip has different radii at different pre-determined locations around the circumference of the combustion bowl, with the radius of said lip larger in the sections thereof above at least the central part of said pin bore than in other sections of said lip.

2. The piston of claim 1, further characterized in that the radius of the lip is large in the sections thereof above said pin bore, small in the sections thereof which are not above said pin bore, and makes a smooth transition from large to small in the areas immediately adjacent to the sections above said pin bore.

3. The piston of claim 2, further characterized in that said large radius of said lip is about twice said small radius of said lip.

4. The piston of claim 2, further characterized in that said small radius of said lip is about 0.75 mm and said large radius of said lip is about 1.5 mm.

5. An internal combustion engine having at least one cylinder having a plurality of valves, characterized in that the piston of claim 1 is provided in the cylinder, with the larger radius sections of said lip on said piston being positioned substantially beneath said valves.

6. A method of forming the piston of claim 1, comprising:
   a. casting and machining a piston body to produce a piston having a pin bore, and having a combustion bowl with a lip which is substantially sharp around its entire circumference;
   b. brushing the sections of said lip above said pin bore to dull said lip and the sections of said lip immediately adjacent to the sections above said pin bore to provide a smooth transition between the thus dulled sections of said lip and the remaining sharp sections of said lip.

* * * * *

UNITED STATES PATENT AND TRADEMARK OFFICE
CERTIFICATE OF CORRECTION

PATENT NO. : 5,337,714
DATED : August 16, 1994
INVENTOR(S) : Lawrence Paul Tracy It is certified that error appears in the above-indentified patent and that said Letters Patent is hereby corrected as shown below:

On title page, change, "6 Claims, 1 Drawing sheet" to --7 Claims, 1 Drawing Sheet--
Column 4,
    add the following claim:

-- 7. A piston having a piston body having a crown, a combustion bowl formed therein, a lip which serves as the transition between the combustion bowl and the crown, and a pin bore formed therein beneath the combustion bowl, characterized in that the lip has different sharpness at different pre-determined locations around the circumference of the combustion bowl, with the sharpness of said lip less in the sections thereof above at least the central part of said pin bore than in other sections of said lip. --

Signed and Sealed this

Eighteenth Day of October, 1994

Attest:

Attesting Officer

BRUCE LEHMAN

Commissioner of Patents and Trademarks